Nov. 29, 1966  A. H. MÜLLER  3,288,237
MOTOR VEHICLE
Filed April 13, 1964  3 Sheets-Sheet 1
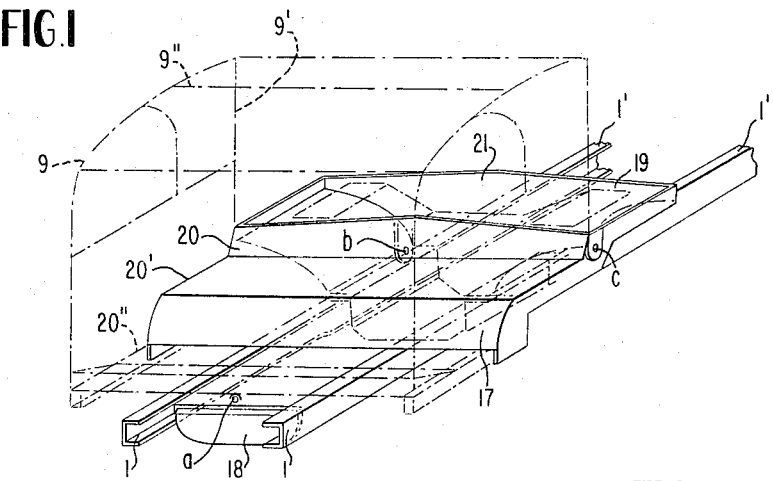
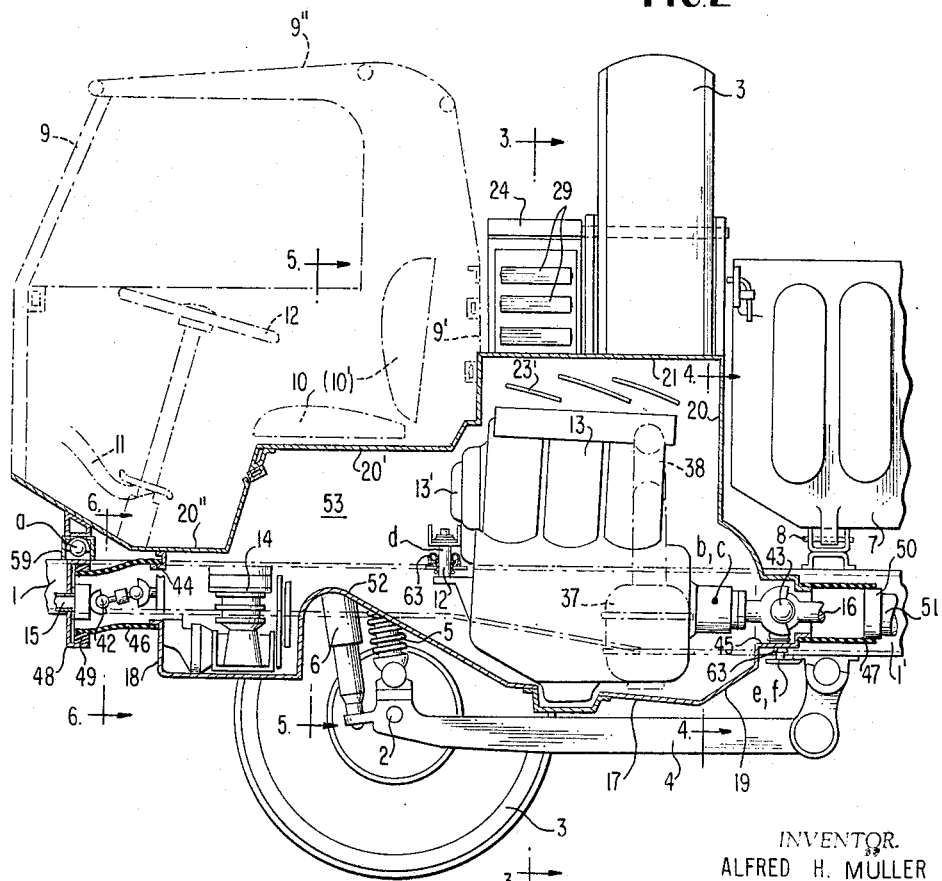
INVENTOR.
ALFRED H. MÜLLER
BY Dicke & Craig
ATTORNEYS Nov. 29, 1966   A. H. MÜLLER   3,288,237
MOTOR VEHICLE Filed April 13, 1964   3 Sheets-Sheet 2

INVENTOR.
ALFRED H. MÜLLER
BY Dicke & Craig
ATTORNEYS

Nov. 29, 1966  A. H. MÜLLER  3,288,237
MOTOR VEHICLE

Filed April 13, 1964  3 Sheets-Sheet 3

INVENTOR.
ALFRED H. MÜLLER
BY Dicke & Craig
ATTORNEYS

United States Patent Office 3,288,237
Patented Nov. 29, 1966

3,288,237
MOTOR VEHICLE
Alfred H. Müller, Waiblingen, Germany, assignor to Daimler-Benz Aktiengesellschaft, Stuttgart-Unterturkheim, Germany
Filed Apr. 13, 1964, Ser. No. 359,209
Claims priority, application Germany, Apr. 17, 1963, D 41,386
17 Claims. (Cl. 180—54)

The present invention relates to a motor vehicle, and more particularly to a cross-country type motor vehicle in which the drive unit is so arranged within a trough-like water-tight housing disposed below the driver cab containing the driver and passenger seats as to make it possible for the vehicle to drive through relatively deep waters.

It is already known in the prior art to support the driver cab of cross-country-type vehicles on the vehicle frame in a freely movable manner within certain limits, inter alia, also in such a manner that the driver cab can swing about the longitudinal center axis thereof with respect to the frame. Furthermore, it is also known in the prior art to arrange in such vehicles the driver cab in front of and above the front axle and to arrange the drive unit consisting of engine and change-speed transmission directly adjoining the driver cab and to the rear of the front axle. Additionally, it is also known in the prior art to support the drive unit elastically on the vehicle frame.

The present invention aims at rendering such types of vehicles capable of fording through relatively deep waters without wetting the drive unit and without having to construct the entire vehicle sub-structure as a water-tight floating body.

The present invention essentially consists in that the vehicle drive engine and the auxiliary aggregate thereof, as well as possibly also other installations driven thereby, are accommodated in a trough-like structure completed into a water-tight housing on which is also secured the driver cab. In the presence of a relatively yielding vehicle frame, the arrangement according to the present invention is preferably made in such a manner that the trough-like structure partakes in the movements of the driver cab movable relative to the frame. With a more rigid vehicle frame, the trough-like structure or housing may be rigidly connected therewith and possibly may form a supporting part of the vehicle frame or chassis. The engine and its auxiliary aggregates may thereby be connected rigidly with the trough-like structure or compartment, or the engine is preferably movably supported on the frame independently of the trough-like structure and the frame. The necessary bearing apertures in the trough-like structure are rendered water-tight by means of elastic intermediate members.

Accordingly, it is an object of the present invention to provide a cross-country motor vehicle which obviates the aforementioned drawbacks and shortcomings encountered with the prior art constructions.

Another object of the present invention resides in the provision of a cross-country motor vehicle of the type described above in which only a relatively small part of the sub-structure has to be rendered water-tight to permit the vehicle to drive through relatively deep waters.

A further object of the present invention resides in the provision of a cross-country type motor vehicle capable of driving through relatively deep waters which is relatively inexpensive in construction, yet permits ready accessibility to the engine parts and auxiliary aggregates notwithstanding the water-tight accommodation thereof within the vehicle.

Still another object of the present invention resides in the provision of a cross-country motor vehicle in which the water-tight compartment accommodating the drive unit is kept relatively small while assuring good ventilation and cooling, even for air-cooled engines.

These and other objects, features and advantages of the present invention will become more obvious from the following description when taken in connection with the accompanying drawing which shows, for purposes of illustration only, one embodiment in accordance with the present invention, and wherein FIGURE 1 is a perspective schematic view of the basic arrangement of the assembly of vehicle frame, trough-like engine compartment and driver cab of a cross-country type vehicle in accordance with the present invention;

FIGURE 2 is a longitudinal cross-sectional view through a cross-country motor vehicle in accordance with the present invention, constructed according to the arrangement of FIGURE 1;

Figure 4:
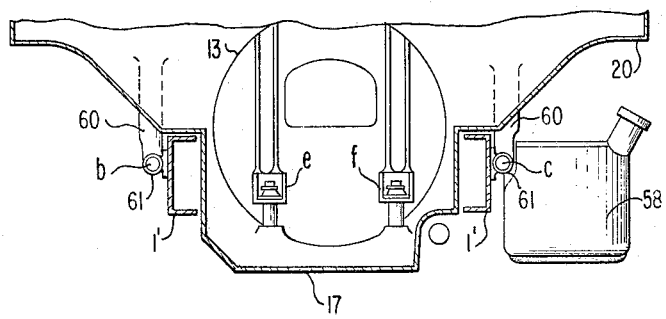
FIGURE 4 is a partial transverse cross-sectional view through the cross-country motor vehicle of FIGURE 2, taken within the area of the rearward engine mounting on the frame, along lines 4—4 of FIGURE 2.
Figure 5:
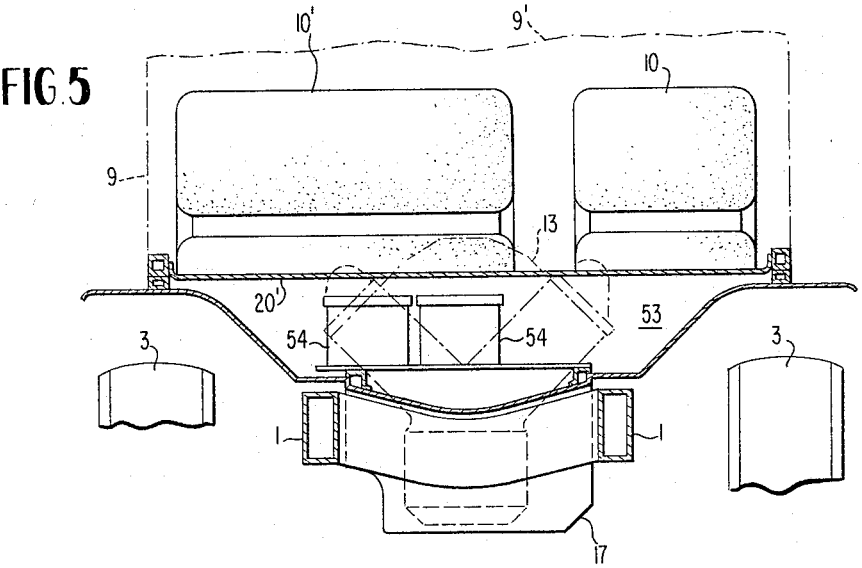
FIGURE 5 is a partial transverse cross-sectional view through the cross-country motor vehicle of FIGURE 2, taken within the area of the seats thereof, along line 5—5 of FIGURE 2.
Figure 6:
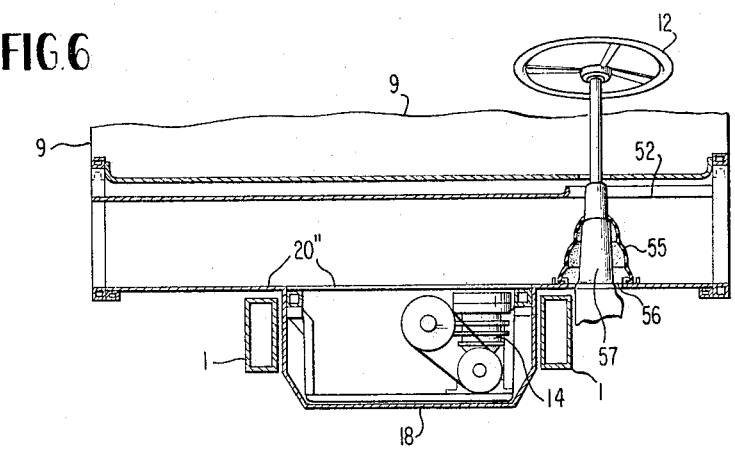
FIGURE 6 is a partial transverse cross-sectional view through the cross-country motor vehicle of FIGURE 2, taken within the area of the steering means, along line 6—6 of FIGURE 2.

Referring now to the drawing wherein like reference numerals are used throughout the various views to designate like parts, reference numerals 1 designate therein the two box-shaped longitudinal frame bearers which are disposed preferably parallel to one another. The upper edges of the longitudinal frame bearers 1, 1 extend horizontally at the same height whereas the bottom edges thereof are disposed lower behind the front axle 2 than in front and above the same, i.e., the cross section 1', 1' (FIGURES 1, 2, 3 and 4) are therefore higher behind the front axle 2 than the cross sections 1, 1 in front thereof (FIGURES 5 and 6). The front wheels 3 (FIGURE 2) are secured on guide members 4 swinging in the vehicle longitudinal direction and are spring-supported by means of non-guided coil springs 5. One shock absorber 6 each is arranged adjacent a respective coil spring 5. The car body 7, which may be of any conventional construction, for instance, of delivery truck type construction, and provided, for example, with side walls adapted to be dropped down, rests on the rearward frame section 1', 1'. The car body 7 can thereby possibly also be tilted laterally, for example, about hinges 8. Possibly a tilting installation may also be provided either alone or additionally which lifts the car body in front thereof. Since such tilting arrangements are well known, per se, in the prior art, a detailed showing thereof is dispensed with herein.

At some distance in front of the vehicle body 7, the driver cab 9 together with the seats 10, 10', the usual foot pedals 11 (FIGURE 2) and the steering means 12 rises in front of and above the front axle 2. The engine 13, for example, an air-cooled V-type engine 13 is accommodated to the rear and below the seats 10, 10' within the space between the driver cab rear wall 9' (FIGURES 1 and 2) and the vehicle body 7. The driver cab 9 consists either exclusively of rigid walls or only the lower portion thereof is constructed rigidly and the upper part thereof is closed off by a foldable convertible roof top 9". It is further assumed that the engine 13 additionally drives a compressor 14 (FIGURES 2 and 6), one or several pumps, especially hydro-pumps, a generator and/or other auxiliary aggregates and/or also one or several take-off shafts 15 (FIGURE 2). The vehicle drive 16 (FIGURE 2) extends rearwardly as a Cardan shaft in the usual manner.

Figure 3:
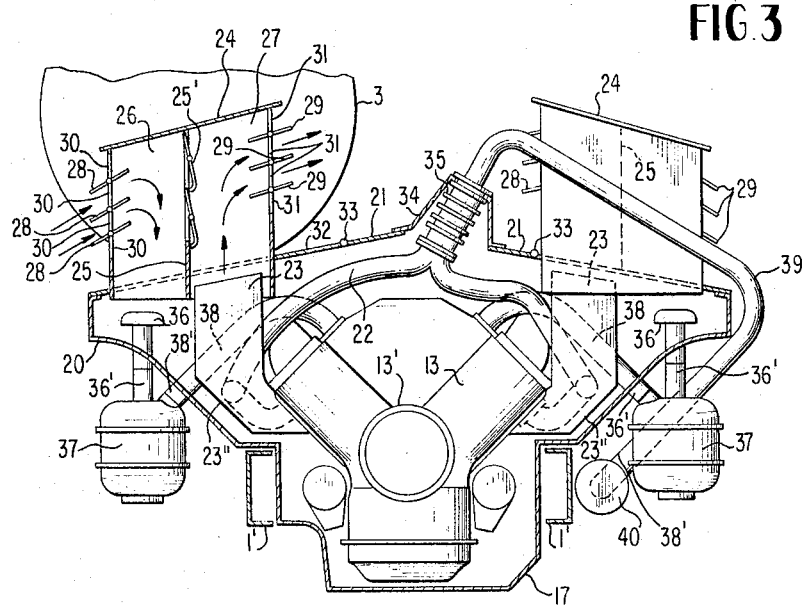
FIGURE 3 is a partial transverse cross-sectional view through the cross-country motor vehicle of FIGURE 2, taken within the area of the engine cooling and ventilation means, along line 3—3 of FIGURE 2.

According to the present invention, the driver cab 9 is secured on an enclosed housing which is composed of a trough-like bottom structure 17 having a front and rear wall 18 and 19 (FIGURES 1 and 2) and of a body member 20, 20' and 20" offset downwardly three times in a step-like manner from the rear toward the front thereof (FIGURE 1). As shown in particular in FIGURE 2, the water-tight housing 17, 18, 19 20, 20' and 20" encloses the engine 13, the compressor 14 and other auxiliary aggregates as well as the drive thereof. The cover surface 21 of the rearward housing section 20 flangedly mounted in a water-tight manner on the bottom trough 17 slants downwardly toward both vehicle sides in the manner of a cathedral roof (FIGURE 3). As to the rest, the space of the housing section 17, 18, 19, 20, 20' and 20" is so large that the exhaust pipes 22 of the engine 13 and two exhaust shafts 23 for the heated cooling air which rise within the trough-like structure 20 still find place therein. The exhaust shafts 23 are formed by the upwardly extending ends of partition walls 23" secured to the engine (FIGURE 3) which enclose the exhaust pipes 22 and at the same time assure that the sucked-in relatively cold cooling air and the flowing-off hot air do not mix within the trough-like compartment 20. The exhaust shafts 23 extend into two air guide housings 24. The air guide housings 24 are subdivided by a partition wall 25 into an air supply shaft 26 and an air discharge shaft 27, respectively. Both shafts 26 and 27 are in communication with the atmosphere by way of apertures 30 and 31 adapted to be closed by adjustable flaps 28 and 29. In order to enable also a direct flow of the hot flowing-off air from the discharge shaft 27 into the supply shaft 26 thereby to achieve an air circulation, the partition wall 25 is also provided with flaps 25' adapted to open into the shaft 26. All of the flaps 25', 28, 29 may be adjusted either automatically or manually or possibly also may be controlled by an desired function of the internal combusion engine.

As may be seen from FIGURES 2 and 3, the air flows through the apertures 30 and through the fresh air shaft 26 into the trough-like compartment 20 under the suction effect of a conventional blower (not shown) flangedly connected to and driven by the engine 13. Behind the blower, the cooling air is then guided through the cooling ribs of the cylinders by means of a conventional air guide pipe or duct (not shown) secured to the engine and enters subsequently into the exhaust shafts 23. From the exhaust shafts 23, the heated cooling air enters into the discharge shafts 27 and flows again into the atmosphere by way of apertures 31. Each air shaft housing 24 is secured on a respective cover lid 32 (FIGURE 3) of the cover surface 21. The lids 32 can be swung about hinges 33 whereby the engine 13 becomes accessible from the top thereof. Within the area of the apex of the cover surface 21 is disposed a small chimney-like projection 34 within which is accommodated an exhaust pipe section 35 effective as pipe expansion compensator. The suction connections 36 of the air filters 37 together with the suction lines 38 adjoining the air filters 37 are also disposed within the housing section 20, whereas the filter housings 37 themselves are arranged outside the water-tight trough-like compartment 17, 18, 19, 20, 20', 20" and are secured, for example, at the trough-like compartment 20 or to the vehicle frame. In order to gain a certain freedom of movement of the ends of the filter connecting pipes or lines with respect to the stationary filter bodies 37, the pipes or lines 36, 38 are interrupted preferably outside of the compartment 20 by intermediate elastic pipe or line sections 36', 38' (FIGURE 3). The common exhaust manifold 39 adjoining the expansion compensator 35 terminates in a muffler 40 which is secured at a suitable place outside the compartment 20 laterally of the frame section 1' of the vehicle.

In the end walls of the front and rear sections 18 and 19 of the trough-like compartment 20 are provided apertures 44 and 45 facing in the driving direction of the vehicle for the passage of the take-off shaft drive 42 and the Cardan shaft drive 43 or for the Cardan shaft 16 itself. The apertures 44 and 45 are provided with external neck portions on which are mounted elastic sleeves 46 and 47, respectively, which seal the apertures 44 and 45 against the outside. The free end of the sleeve 46 is extended to an annular seal 49 arranged within the forward frame cross bearer 48. The free end of the rear sleeve 47 sealingly abuts against the end flange 50 of a pipe 51 accommodating the Cardan shaft 16 or directly to the transmission housing.

The center section of the trough-like housing 20 is provided at the bottom thereof with a tunnel-like indentation or recess 52 (FIGURE 2) in order to give to the front axle 2 sufficient freedom of movement. The cover surface 20' of this section serves as abutment surface for the driver and passenger seats 10 and 10' (FIGURE 5). There is also still sufficient place within the trough-like space 53, below the seats 10, 10', for the accommodation of one or several vehicle batteries 54 (FIGURE 5), a tool box, or other tools to be taken along. The space 53 is accessible from the driver cab 9 through apertures adapted to be closed.

The forward trough-like section 18 (FIGURE 6) accommodates the aforementioned compressor 14 and/or similar auxiliary aggregates and the drive unit for the take-off shaft 15. The forward section 20" of the cover surface 21 forms the driver cab floor. A bottom aperture 56 for the passage of the steering column and/or a part of the steering gear housing 57 is provided within the same area in the trough bottom. The bottom aperture 56 is sealed off by means of a rubber sleeve 55. The fuel tank 58 (FIGURE 4) is located within the area of the engine 13 outside the trough-like housing 20 and the vehicle frame. So much space remains between the air shaft housings 24 rising to the rear of the driver cab 9 and the front wall of the vehicle body 7 that a spare wheel 3' and possibly also additional auxilary equipment may be accommodated thereat.

According to still a further feature of the present invention, the trough-like water-tight housing 17, 18, 19, 20, 20', 20" is elastically supported on the vehicle frame 1, 1' preferably at three points $a, b, c$ (FIGURES 1, 2 and 4), and more particularly in such a manner that the trough-like water-tight housing 17–20 is able to carry out a movement about the vehicle longitudinal axis as well as transversely with respect thereto within certain limits. For this purpose, an elastic universal joint bearing 59 is provided for the bearing support point $a$ in front of the housing 17–20 in the vehicle center (FIGURE 2). Two support brackets 60, 60 (FIGURE 4) extend downwardly from the rear wall of the housing section 20 and are elastically supported at bearing support points $b$ and $c$ on the elastic bearing places 61 provided on the outside of the frame longitudinal bearer sections 1', 1'.

Figure 7:
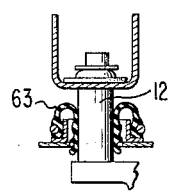
FIGURE 7 is a partial longitudinal cross-sectional view, on an enlarged scale, through an elastic bearing, for example, for the engine.

The engine 13 is elastically supported in a similar manner directly on the frame in three places $d, e, f$ (FIGURES 2 and 4), and more particularly independently of the bearing support of the housing 17, 20 on the frame. The one-point bearing support $d$ can also be replaced by two elastic bearings disposed adjacent one another at a slight distance. The trough bottom is provided with a corresponding number of apertures for the passage of the support brackets 62 (FIGURE 7) which apertures are sealed off by sleeves 63, folding bellows or the like. As shown in FIGURES 1, 2 and 4, the housing 17–20 enclosing the engine 13 and also the engine 13 itself can move independently of one another with respect to the vehicle frame.

While I have shown and described one embodiment in accordance with the present invention, it is understood that the same is not limited thereto, but is susceptible of numerous changes and modifications as known to a person skilled in the art. For example, instead of the air-cooled engine, a water-cooled engine may be utilized within the scope of the present invention. In that case, the radiator is appropriately arranged forwardly on the vehicle frame. Furthermore, the construction of the engine is not limited within the spirit of the present invention, to a V-shaped arrangement of the cylinders. Additionally, the seats 10, 10' can also be replaced by a continuous seating bench.

Thus, it is obvious that the present invention is not limited to the details shown and described herein, but is susceptible of numerous changes and modifications as known to a person skilled in the art, and I therefore do not wish to be limited to the details shown and described herein, but intend to cover all such changes and modifications as are encompassed by the scope of the appended claims.

I claim:
1. A vehicle suitable for cross-country driving, comprising:
   frame means,
   a driver cab,
   drive means including a driving engine and engine accessories,
   said driver cab being movable relative to said frame means within certain limits,
   front axle means,
   said driver cab being arranged above and in front of said front axle means and said engine being arranged above and to the rear of the front axle means,
   and a trough-like structure complemented into watertight housing means accommodating therein the driving engine and at least some of the engine accessories,
   said driver cab resting on said housing means,
   said housing means having a trough-like bottom cross section which is closed off by cover means offset in a step-like manner downwardly from the rear toward the front thereof.

2. A vehicle suitable for cross-country driving, comprising:
   frame means,
   a driver cab,
   drive means including a driving engine and engine accessories as well as devices driven thereby,
   said driver cab and drive means being movable relative to said frame means within certain limits,
   front axle means,
   said driver cab being arranged above and in front of said front axle means and said engine being arranged above and to the rear of the front axle means,
   and a trough-like structure complemented into watertight housing means accommodating therein the driving engine and at least some of the engine accessories as well as of the devices driven thereby,
   said driver cab resting on said housing means,
   and means for supporting said engine on said frame means in such a manner as to be movable with respect to the frame means independently of the housing means enclosing the engine,
   said housing means having a trough-like bottom cross section which is closed off by cover means offset in a step-like manner downwardly from the rear toward the front thereof.

3. A vehicle suitable for cross-country driving, comprising:
   frame means,
   a driver cab,
   drive means including a driving engine and auxiliary accessories,
   said driver cab being movable relative to said frame means within certain limits,
   front axle means,
   sad driver cab being arranged above and in front of said front axle means and said engine being arranged above and to the rear of the front axle means,
   and a trough-like structure complemented into watertight housing means accommodating therein the driving engine and at least some of the auxiliary accessories,
   said driver cab resting on said housing means,
   the section of said housing means accommodating the driving engine simultaneously serving at least in part as air guide means,
   said air guide means including two air guide shaft means extending upwardly from the section of the housing means enclosing the engine, each of said air shaft means serving simultaneously for the cooling air supply and cooling air discharge.

4. A vehicle suitable for cross-country driving, comprising:
   frame means,
   a driver cab,
   drive means including a driving engine and auxiliary accessories, said driver cab being movable relative to said frame means within certain limits,
   front axle means,
   said driver cab being arranged above and in front of said front axle means and said engine being arranged above and to the rear of the front axle means,
   and a trough-like structure complemented into watertight housing means accommodating therein the driving engine and at least some of the auxiliary accessories,
   said driver cab resting on said housing means,
   the section of said housing means accommodating the driving engine simultaneously serving at least in part as air guide means,
   said air guide means including two air guide shaft means extending upwardly from the section of the housing means enclosing the engine, each of said air shaft means serving simultaneously for the cooling air supply and cooling air discharge,
   said two air guide shaft means being each subdivided by partition wall means into an air supply channel and into an air discharge channel, aperture means in each channel providing a communication for the respective channel with the atmosphere, controllable flap means for each of said last-mentioned aperture means, and further aperture means provided in a respective partition wall means including flap means operable to selectively close said further aperture means to flow of the air as circulating air from a discharge channel into a respective supply channel.

5. A vehicle suitable for cross-country driving, comprising:
   frame means,
   a driver cab,
   drive means including a driving engine and auxiliary accessories,
   said driver cab being movable relative to said frame means within certain limits,
   front axle means,
   said driver cab being arranged above and in front of said front axile means and said engine being arranged above and to the rear of the front axle means,
   and a trough-like structure complemented into watertight housing means accommodating therein the driving engine and at least some of the auxiliary accessories,
   said driver cab resting on said housing means,
   the section of said housing means accommodating the driving engine simultaneously serving at least in part as air guide means, said air guide means including two air guide shaft means extending upwardly from the section of the housing means enclosing the engine, each of said air shaft means serving simultaneously for the cooling air supply and cooling air discharge, said two air guide shaft means being each subdivided by partition wall means into an air supply channel and into an air discharge channel, aperture means in each channel providing a communication for the respective channel with the atmosphere, controllable flap means for each of said last-mentioned aperture means, and further aperture means provided in a respective partition wall means including flap means operable to selectively close said further aperture means to enable flow of the air as circulating air from a discharge channel into a respective supply channel, said air guide shaft means being secured at cover surface means connected to the section of housing means enclosing the engine.

6. A vehicle suitable for cross-country driving, comprising:

frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into water-tight housing means accommodating therein the driving engine and at least some of the auxiliary accessories,
said driver cab resting on said housing means,
the section of said housing means accommodating the driving engine simultaneously serving at least in part as air guide means,
said air guide means including two air guide shaft means extending upwardly from the section of the housing means enclosing the engine, each of said air shaft means serving simultaneously for the cooling air supply and cooling air discharge,
said two air guide shaft means being each subdivided by partition wall means into an air supply channel and into an air discharge channel, aperture means in each channel providing a communication for the respective channel with the atmosphere, controllable flap means for each of said last-mentioned aperture means, and further aperture means provided in a respective partition wall means including flap means operable to selectively close said further aperture means to enable flow of the air as circulating air from a discharge channel into a respective supply channel,
said air guide shaft means being secured at cover surface means connected to the section of housing means enclosing the engine,
said air guide means further including exhaust air connecting means formed by partition wall elements secured at the engine which extend into the discharge channels of the air guide shaft means, said partition wall elements shielding the exhaust pipes of the engine against the sucked-in fresh cooling air and preventing a mixing of fresh and heated cooling air within the housing means.

7. A vehicle suitable for cross-country driving, comprising:

frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into water-tight housing means accommodating therein the driving engine and at least some of the auxiliary accessories,
said driver cab resting on said housing means,
said housing means having a trough-like bottom cross section which is closed off by cover surface means offset in a step-like manner downwardly from the rear toward the front thereof,
the section of said housing means accommodating the driving engine simultaneously serving at least in part as air guide means,
said air guide means including two air guide shaft means extending upwardly from the cover surface means flangedly connected in a water-tight manner on the section of the housing means enclosing the engine, each of said air shaft means serving simultaneously for the cooling air supply and cooling air discharge.

8. A vehicle suitable for cross-country driving, comprising:

frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into water-tight housing means accommodating therein the driving engine and at least some of the auxiliary accessories,
said driver cab resting on said housing means,
said housing means having a trough-like bottom cross section which is closed off by cover surface means offset in a step-like manner downwardly from the rear toward the front thereof,
the section of said housing means accommodating the driving engine simultaneously serving at least in part as air guide means,
said air guide means including two air guide shaft means extending upwardly from the cover surface means flangedly connected in a water-tight manner on the section of the housing means enclosing the engine, each of said air shaft means serving simultaneously for the cooling air supply and cooling air discharge,
said air guide shaft means being secured at cover surface means connected to the section of housing means enclosing the engine and hinge means to enable said last-mentioned cover surface means to pivot while at the same time providing a water-tight closing of said housing means.

9. A vehicle suitable for cross-country driving, comprising:

a frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means, and a trough-like structure complemented into water-tight housing means accommodating therein the driving engine and at least some of the auxiliary accessories, said driver cab resting on said housing means, the section of said housing means accommodating the driving engine simultaneously serving at least in part as air guide means, said air guide means including two air guide shaft means extending upwardly from the section of the housing means enclosing the engine, each of said air shaft means serving simultaneously for the cooling air supply and cooling air discharge, said air guide means further including exhaust air connecting means formed by partition wall elements secured at the engine which extend into the discharge channels of the air guide shaft means, said partition wall elements shielding the exhaust pipes of the engine against the sucked-in fresh cooling air and preventing a mixing of fresh and heated cooling air within the housing means.

10. A vehicle suitable for cross-country driving, comprising:

a frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into water-tight housing means accommodating therein the driving engine and at least some of the auxiliary accessories,
said driver cab resting on said housing means,
said housing means having a trough-like bottom cross section which is closed off by cover surface means offset in a step-like manner downwardly from the rear toward the front thereof,
the section of said housing means accommodating the driving engine simultaneously serving at least in part as air guide means,
said air guide means including two air guide shaft means extending upwardly from the cover surface means flangedly connected in a water-tight manner on the section of the housing means enclosing the engine, each of said air shaft means serving simultaneously for the cooling air supply and cooling air discharge,
said two air guide shaft means being each subdivided by partition wall means into an air supply channel and into an air discharge channel, aperture means in each channel providing a communication for the respective channel with the atmosphere, controllable flap means for each of said last-mentioned aperture means, and further aperture means provided in a respective partition wall means including flap means operable to selectively close said further aperture means to enable flow of the air as circulating air from a discharge channel into a respective supply channel,
said air guide shaft means being secured at cover surface means connected to the section of housing means enclosing the engine, and hinge means to enable said last-mentioned cover surface means to pivot while at the same time providing a water-tight closing of said housing means,
said air guide means further including exhaust air connecting means formed by partition wall elements secured at the engine which extend into the discharge channels of the air guide shaft means, said partition wall elements shielding the exhaust pipes of the engine against the sucked-in fresh cooling air and preventing a mixing of fresh and heated cooling air within the housing means.

11. A vehicle suitable for cross-country driving, comprising:

frame means,
a driver cab,
drive means including a driving engine, and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into water-tight housing means accommodating therein the driving engine and at least some of the auxiliary accessories,
said driver cab resting on said housing means,
said housing means having a trough-like bottom cross section which is closed off by cover means offset in a step-like manner downwardly from the rear toward the front thereof,
two air guide means extending upwardly from the cover surface means flangedly connected in a water-tight manner on the section of the housing means enclosing the engine, each of said shaft means forming cooling air supply and discharge shafts,
air filter means disposed outside said housing means, and intake line means connected with said air filter means and disposed at least in part within said housing means within the area of the cooling air supply shafts,
said air filter means being secured at one of the two parts consisting of said housing means and frame means, and the parts of the intake line means connected with said filter means which are disposed outside the housing means consisting at least in part of elastic line sections.

12. A vehicle suitable for cross-country driving, comprising:

frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into water-tight housing means accommodating therein the driving engine and at least some of the auxiliary accessories,
said driver cab resting on said housing means,
said housing means having a trough-like bottom cross section which is closed off by cover means offset in a step-like manner downwardly from the rear toward the front thereof,
the step of the cover surface means disposed in front of the engine of said housing means serving as abutment surface for the seats.

13. A vehicle suitable for cross-country driving, comprising:

frame means,
a driver cab,
drive means including a driving engine and auxiliary accessories, said driver cab being movable relative to said frame means within certain limits,
front axle means,
said driver cab being arranged above and in front of said front axle means and said engine being arranged above and to the rear of the front axle means,
and a trough-like structure complemented into watertight housing means accommodating therein the driving engine and at least some of the auxiliary accessories,
said driver cab resting on said housing means,
said housing means having a trough-like bottom cross section which is closed off by cover means offset in a step-like manner downwardly from the rear toward the front thereof,
and the lowermost section of the stepped cover surface means of the housing means forming the driver cab floor.

14. A vehicle suitable for cross-country driving, comprising:
frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into watertight housing means accommodating therein the driving engine and at least some of the auxiliary accessories,
said driver cab resting on said housing means,
said housing means having a trough-like bottom cross section which is closed off by cover means offset in a step-like manner downwardly from the rear toward the front thereof,
the step of the cover surface means disposed in front of the engine of said housing means serving as abutment surface for the seats,
and the lowermost section of the stepped cover surface means of the housing means forming the driver cab floor.

15. A vehicle suitable for cross-country driving, comprising:
frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into watertight housing means accommodating therein the driving engine and at least some of the auxiliary accessories,
said driver cab resting on said housing means,
said housing means having a trough-like bottom cross-section which is closed off by cover means offset in a step-like manner downwardly from the rear toward the front thereof,
the bottom of said housing means being provided with a tunnel-like indentation for the accommodation of the front axle means.

16. A vehicle suitable for cross-country drives, comprising:
frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into watertight housing means accommodating therein the driving engine and at least some of said auxiliary accessories,
said driver cab resting on said housing means,
said housing means having a trough-like bottom cross section which is closed off by cover means,
an exhaust line expansion compensator means constructed as common exhaust manifold arranged between the engine exhaust pipes and the cover means for said housing means.

17. A vehicle suitable for cross-country drives, comprising:
frame means,
a driver cab,
drive means including a driving engine and auxiliary accessories,
said driver cab being movable relative to said frame means within certain limits,
front axle means,
said driver cab being arranged above and in front of said front axle means and said engine being arranged above and to the rear of the front axle means,
and a trough-like structure complemented into watertight housing means accommodating therein the driving engine and at least some of said auxiliary accessories,
said driver cab resting on said housing means,
said housing means having a trough-like bottom cross section which is closed off by cover means,
an exhaust line expansion compensator means constructed as common exhaust manifold arranged between the engine exhaust pipes and the cover means for said housing means,
and a chimney-like projection in said cover means for said compensator means.

References Cited by the Examiner

UNITED STATES PATENTS

| | | | |
|---|---|---|---|
| 2,341,165 | 2/1944 | Todd | 115—1 |
| 2,397,792 | 4/1946 | Kramer et al. | 115—1 |
| 2,719,044 | 9/1955 | Walter | 280—106 |
| 2,720,931 | 10/1955 | Thannhauser | 180—89 |
| 2,981,221 | 4/1961 | Gillois et al. | 115—1 |

FOREIGN PATENTS

| | | |
|---|---|---|
| 771,619 | 4/1957 | Great Britain. |

BENJAMIN HERSH, *Primary Examiner.*

MILTON L. SMITH, *Examiner.*